US008424293B2

(12) United States Patent
Marlett et al.

(10) Patent No.: US 8,424,293 B2
(45) Date of Patent: Apr. 23, 2013

(54) DIESEL PARTICULATE FILTER EXTENDED IDLE REGENERATION

(75) Inventors: Chad E. Marlett, Plymouth, MI (US); Julian C. Tan, Canton, MI (US); David A. Richeson, Livonia, MI (US)

(73) Assignee: GM Global Technology Operations LLC

( * ) Notice: Subject to any disclaimer, the term of this patent is extended or adjusted under 35 U.S.C. 154(b) by 1122 days.

(21) Appl. No.: 12/042,559

(22) Filed: Mar. 5, 2008

(65) Prior Publication Data

US 2009/0019838 A1    Jan. 22, 2009

Related U.S. Application Data

(63) Continuation-in-part of application No. 11/965,057, filed on Dec. 27, 2007, now Pat. No. 7,689, 345.

(60) Provisional application No. 60/959,967, filed on Jul. 18, 2007.

(51) Int. Cl.
| | |
|---|---|
| F01N 3/00 | (2006.01) |
| F01N 3/02 | (2006.01) |
| F16H 59/74 | (2006.01) |
| B60W 10/04 | (2006.01) |
| B60W 10/10 | (2012.01) |

(52) U.S. Cl.
USPC ............... 60/295; 60/297; 60/311; 477/107; 477/110

(58) Field of Classification Search ............ 60/274, 60/287, 290, 295, 297, 311; 123/339.16, 123/142.5 R, 491; 477/100, 107, 110; 701/113
See application file for complete search history.

(56) References Cited

U.S. PATENT DOCUMENTS

| | | |
|---|---|---|
| 7,181,332 B1 | 2/2007 | Vick et al. |
| 7,292,928 B2 | 11/2007 | Vick et al. |
| 7,305,950 B1 | 12/2007 | Sinnamon |
| 7,464,676 B2 | 12/2008 | Wiggins et al. |
| 7,472,013 B1 | 12/2008 | Wiggins et al. |
| 2003/0106308 A1* | 6/2003 | Gabe et al. ............. 60/295 |
| 2004/0112045 A1* | 6/2004 | Gomulka ............. 60/295 |
| 2004/0172935 A1* | 9/2004 | Otake et al. ............. 60/295 |
| 2004/0200213 A1* | 10/2004 | Igarashi et al. ............. 60/295 |
| 2005/0288150 A1 | 12/2005 | Hitch et al. |
| 2006/0218897 A1* | 10/2006 | Sisken et al. ............. 60/284 |

(Continued)

FOREIGN PATENT DOCUMENTS

| | | |
|---|---|---|
| CN | 1423035 A | 6/2003 |
| CN | 1740541 A | 3/2006 |
| CN | 101089374 | 12/2007 |
| DE | 69021803 T2 | 1/1996 |

(Continued)

OTHER PUBLICATIONS

U.S. Appl. No. 11/965,057, filed Dec. 27, 2007, Layne K. Wiggins.

*Primary Examiner* — Kenneth Bomberg
*Assistant Examiner* — Audrey K Bradley

(57) ABSTRACT

A method of regenerating a diesel particulate filter (DPF) may include operating a vehicle including a diesel engine at an idle condition and applying a load to the diesel engine during the idle condition to increase an exhaust temperature of the diesel engine relative to a nominal idle condition. The increased exhaust temperature may regenerate a diesel particulate filter of the diesel engine during the idle condition.

16 Claims, 3 Drawing Sheets

U.S. PATENT DOCUMENTS

| | | | |
|---|---|---|---|
| 2006/0266017 A1* | 11/2006 | Kresse | 60/274 |
| 2007/0044453 A1* | 3/2007 | Strauser et al. | 60/286 |
| 2007/0214772 A1 | 9/2007 | England | |
| 2007/0251220 A1* | 11/2007 | Dawson et al. | 60/295 |
| 2007/0265805 A1 | 11/2007 | Lee et al. | |

FOREIGN PATENT DOCUMENTS

| | | |
|---|---|---|
| DE | 102005029256 | 1/2006 |
| EP | 0411445 A2 | 2/1991 |
| EP | 1316692 A1 | 6/2003 |

\* cited by examiner

DIESEL PARTICULATE FILTER EXTENDED IDLE REGENERATION

CROSS-REFERENCE TO RELATED APPLICATIONS

This application is a continuation in part of U.S. patent application Ser. No. 11/965,057 filed on Dec. 27, 2007. This application claims the benefit of U.S. Provisional Application No. 60/959,967, filed on Jul. 18, 2007. The disclosures of the above applications are incorporated herein by reference in their entirety.

FIELD

The present disclosure relates to diesel engine operation, and more specifically to regeneration of a diesel particulate filter.

BACKGROUND

The statements in this section merely provide background information related to the present disclosure and may not constitute prior art.

Diesel particulate filters (DPF) may be used in vehicles having diesel engines to reduce emissions of particulate matter (soot) generated during combustion. The DPF typically removes soot from the exhaust gas stream and stores the soot therein. The DPF is typically regenerated, or cleaned, after a predetermined soot level is reached. The DPF may be regenerated, or cleaned, by modifying the combustion process of the diesel engine and/or injecting fuel into the exhaust stream in order to increase the temperature of the exhaust gas

SUMMARY

A method of regenerating a diesel particulate filter (DPF) may include operating a vehicle including a diesel engine at an idle condition and applying a load to the diesel engine during the idle condition to increase an exhaust temperature of the diesel engine relative to a nominal idle condition. The increased exhaust temperature may regenerate a diesel particulate filter of the diesel engine during the idle condition.

The method may further include determining a particulate matter accumulation level in the DPF and applying the load when the particulate matter level is greater than a predetermined limit. The load may be applied to the diesel engine through a transmission coupled thereto.

A vehicle may include an engine idle control module, a diesel particulate filter evaluation module, and an engine load control module. The control modules may be in communication with one another. The engine idle control module may operate a diesel engine of the vehicle at an idle condition. The diesel particulate filter evaluation module may determine a particulate matter accumulation level of a diesel particulate filter in an exhaust flow path of the diesel engine. The engine load control module may selectively apply a load to the diesel engine during the idle condition to increase an exhaust temperature of the diesel engine to regenerate the diesel particulate filter.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
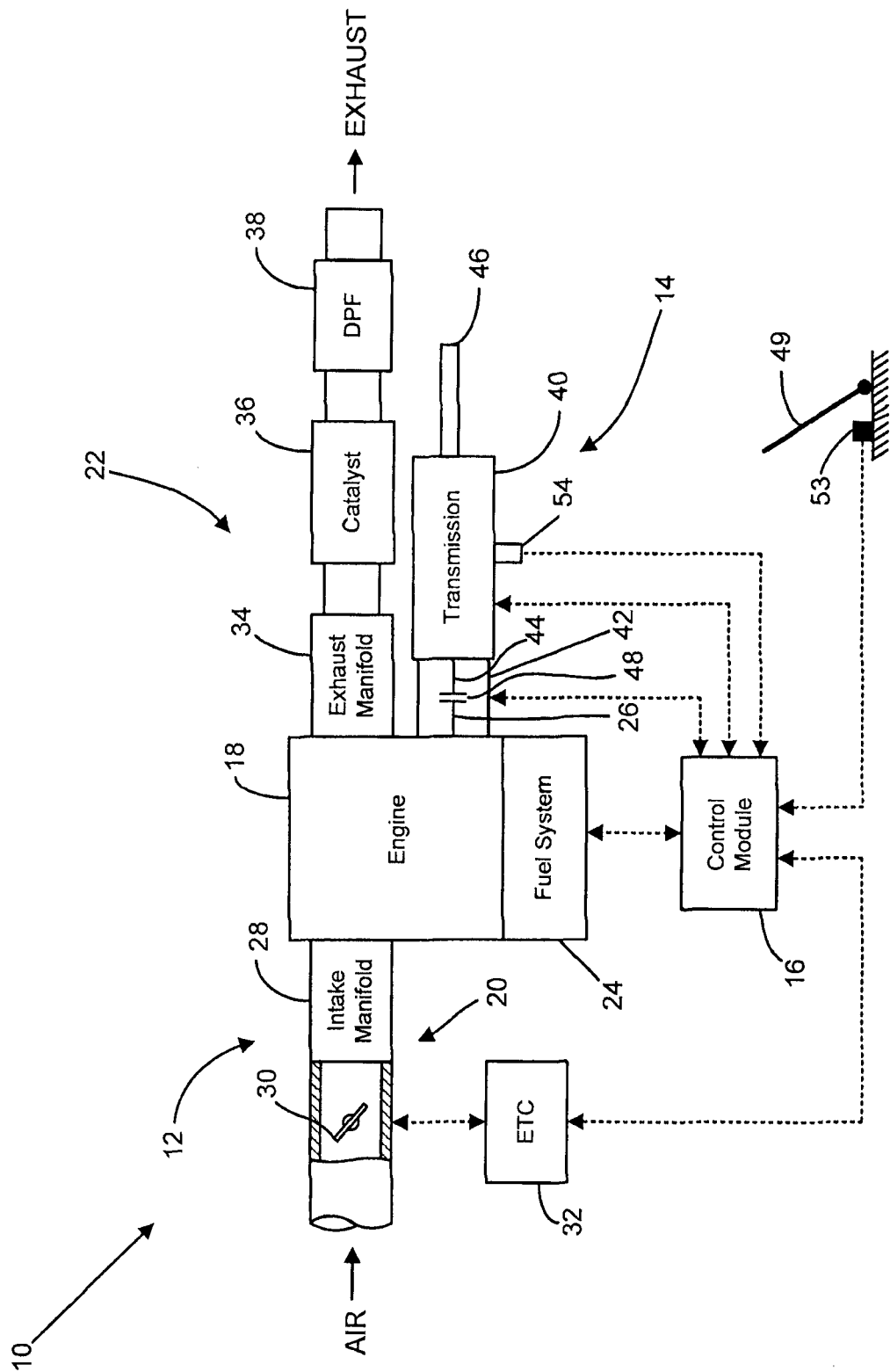
FIG. 1 is a schematic illustration of a vehicle according to the present disclosure.

The following description is merely exemplary in nature and is not intended to limit the present disclosure, application, or uses. For purposes of clarity, the same reference numbers will be used in the drawings to identify similar elements. As used herein, the term "module" refers to an application specific integrated circuit (ASIC), an electronic circuit, and/or a processor (shared, dedicated, or group) and memory that execute one or more software or firmware program.

Referring to FIG. 1, a vehicle 10 may include an engine assembly 12, a transmission assembly 14, and a control module 16. Engine assembly 12 may include a diesel engine 18, an intake system 20, an exhaust system 22, and a fuel system 24. Diesel engine 18 may include a crankshaft 26 providing an output torque therefrom. Intake system 20 may be in communication with diesel engine 18 and may include an intake manifold 28, a throttle 30, and an electronic throttle control (ETC) 32. ETC 32 may actuate throttle 30 to control an air flow into diesel engine 18. Exhaust system 22 may be in communication with diesel engine 18 and may include an exhaust manifold 34, a catalyst 36, and a diesel particulate filter (DPF) 38. Fuel system 24 may provide fuel to diesel engine 18. Exhaust gas created by combustion of the air/fuel mixture may exit diesel engine 18 through exhaust system 22.

Transmission assembly 14 may include a transmission 40 and a coupling device 42. Transmission 40 may be an automatic transmission, such as the M74 Automatic Transmission available from Allison Transmission® of Indianapolis, Ind., and may include input and output shafts 44, 46. Coupling device 42 may generally be in the form of a torque converter including a torque converter clutch (TCC) 48. TCC 48 may be actuated to provide engagement between crankshaft 26 and input shaft 44. Transmission 40 may selectively lock output shaft 46 to prevent rotation thereof, preventing transmission of drive torque to wheels (not shown) of vehicle 10.

Figure 2:
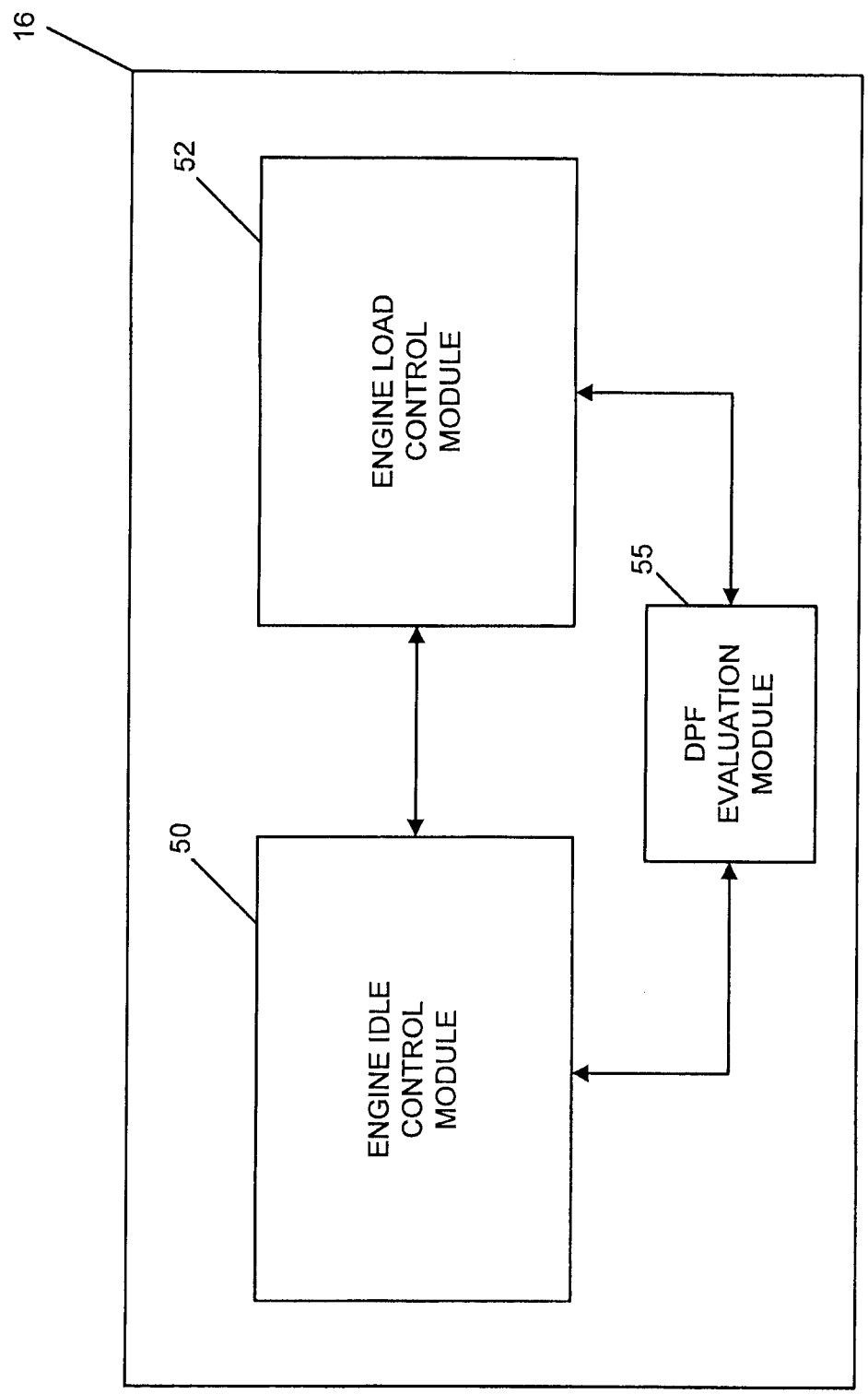
FIG. 2 is a control block diagram of the control module shown in FIG. 1.

Control module 16 may be in communication with engine assembly 12, transmission assembly 14, and an accelerator pedal 49. With additional reference to FIG. 2, control module 16 may include an engine idle control module 50, an engine load control module 52, and a DPF evaluation module 55. Engine idle control module 50 and engine load control module 52 may be in communication with one another. Engine idle control module 50 may additionally be in communication with fuel system 24 and ETC 32 to control air flow and fuel flow into diesel engine 18. Engine idle control module 50 may be in communication with an accelerator pedal sensor 53 of accelerator pedal 49 and may receive a signal indicative of accelerator pedal position therefrom. Engine idle control module 50 may generally determine an operating speed of engine 18 and may control operation of diesel engine 18 at an idle condition.

Engine load control module 52 may additionally be in communication with transmission 40, a transmission fluid temperature sensor 54, and coupling device 42. Engine load control module 52 may determine an operating gear of transmission 40. Engine load control module 52 may selectively lock output shaft 46 of transmission 40 and may selectively actuate TCC 48 to provide a load to diesel engine 18. Engine load control module 52 may additionally monitor the temperature of transmission fluid provided by transmission fluid temperature sensor 54.

DPF evaluation module 55 may be in communication with engine idle control module 50 and engine load control module 52. DPF evaluation module 55 may determine a soot accumulation level of DPF 38. DPF evaluation module 55 may evaluate the determined soot accumulation level relative to a predetermined limit.

Figure 3:
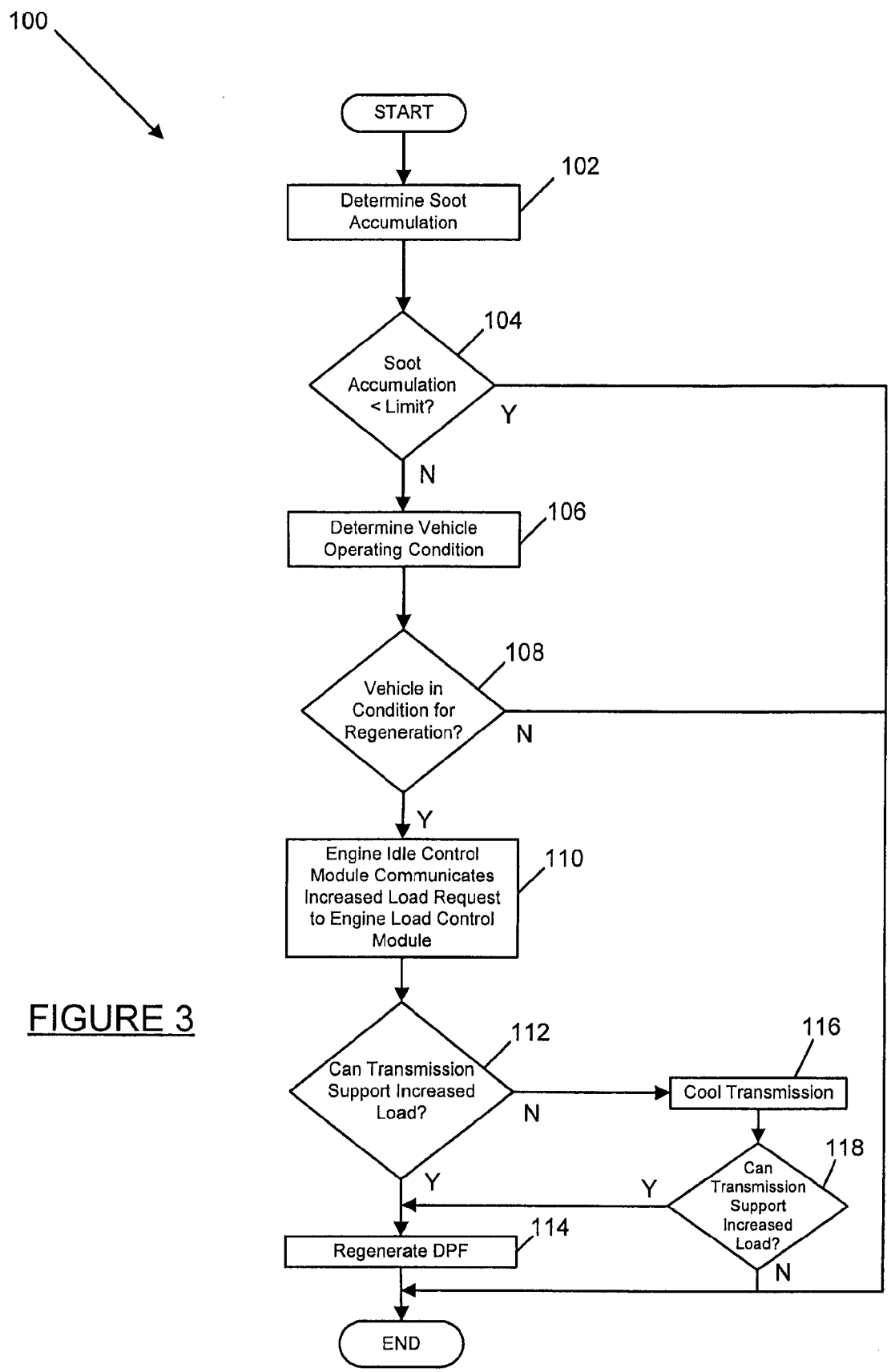
FIG. 3 is a flow diagram illustrating steps for control of the vehicle of FIG. 1.

With reference to FIG. 3, control logic 100 for regeneration of DPF 38 is illustrated. During operation of engine assembly 12, DPF 38 may accumulate particulate matter (soot) present in the exhaust gas from diesel engine 18. DPF 38 may be regenerated (cleaned) when a predetermined amount of particulate matter is accumulated in DPF 38. DPF 38 may be cleaned by operating DPF 38 above a predetermined temperature limit, such as a temperature greater than 500° C. Accordingly, control logic 100 may begin at determination block 102 where an accumulation of particulate matter in DPF 38 is determined.

Determination block 102 may calculate an accumulation of soot within DPF 38 in a variety of ways including a soot loading calculation and/or an algorithm based on operating time of diesel engine 18, distance traveled by vehicle 10, and fuel consumption of diesel engine 18. Control logic 100 may then proceed to decision block 104 where the determined soot accumulation is compared to a predetermined limit. The predetermined limit may generally provide a threshold for a regeneration requirement of DPF 38.

If the determined soot accumulation is less than the predetermined limit, control logic 100 may terminate. If the determined soot accumulation is greater than or equal to the predetermined limit, control logic 100 may proceed to determination block 106 where an operating state of vehicle 10 is determined. Determination of the operating state of vehicle 10 may include an evaluation of accelerator pedal position, an operating gear of transmission 40, and an operating speed of vehicle 10 either individually or in any combination. Control logic 100 may then proceed to decision block 108, where the operating condition of vehicle 10 is evaluated relative to predetermined limits.

Accelerator pedal position may be evaluated relative to a nominal disengaged position. An accelerator pedal position of 0-0.5% engagement relative to the nominal disengaged position may generally indicate that vehicle 10 is in condition for regeneration. Alternatively, or additionally, an operating gear of transmission 40 of park or neutral may generally indicate that vehicle 10 is in condition for regeneration. Alternatively or additionally, an operating speed of vehicle 10 of 0-0.5 kilometers per hour may generally indicate that vehicle 10 is in condition for regeneration. Generally, if diesel engine 18 is in an idle condition, vehicle 10 may be in condition for regeneration.

If vehicle 10 is not in condition for regeneration of DPF 38, control logic 100 may terminate. If the operating state of vehicle 10 is in condition for regeneration of DPF 38, control logic 100 may proceed to control block 110 where engine idle control module 50 communicates to engine load control module 52 that an increased load is desired. After engine idle control module 50 indicates that an increased load is desired, control logic 100 proceeds to decision block 112 where engine load control module 52 evaluates whether transmission 40 can support the increased load request. The determination of whether transmission 40 can support the increased load request may be based on the presence of any operating faults associated with transmission 40 and/or an operating temperature of transmission 40, such as the transmission fluid temperature provided by transmission fluid temperature sensor 54.

If transmission 40 is able to support the increased load request, control logic 100 proceeds to control block 114 where DPF 38 is regenerated, as discussed below. If transmission 40 is unable to support the increased load request, control logic 100 may proceed to control block 116 where transmission 40 may be cooled. Transmission 40 may be cooled by increasing an idle speed of diesel engine 18 and waiting a predetermined time period. After the predetermined time period has elapsed, control logic 100 may proceed to decision block 118, where engine load control module 52 again evaluates whether transmission 40 can support the increased load request. If transmission 40 is still unable to support the increased load request, control logic 100 may terminate. If transmission 40 is able to support the increased load request, control logic 100 may proceed to control block 114 where DPF 38 is regenerated.

Regeneration of DPF 38 may include providing a load to diesel engine 18 from transmission assembly 14. The load may be provided by locking output shaft 46 of transmission 40 while actuating TCC 48. Actuation of TCC 48 while output shaft 46 is locked may generally apply a load to diesel engine 18 at crankshaft 26 while vehicle 10 remains generally stationary. The increased load may generate higher exhaust gas temperatures, resulting in higher temperatures of DPF 38. For example, the increased load may increase the temperature of DPF 38 to a temperature in excess of 500° C.

In addition to the increased engine load applied by transmission assembly 14, regeneration of DPF 38 may include control of various operating parameters of engine assembly 12. Control of operating parameters of engine assembly 12 may include increasing engine speed, increasing the number fuel injection events per cylinder firing event, retarding injection timing, injecting fuel into the exhaust stream, and actuation of throttle 30.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A method comprising:
operating a vehicle including a diesel engine at an idle condition;
applying a load to the diesel engine through a transmission of said vehicle coupled to said diesel engine during the idle condition to increase an exhaust temperature of the diesel engine relative to a nominal idle condition wherein applying said load includes:
determining whether said transmission is capable of applying said load during said idle condition based on an operating temperature of said transmission;
in response to determining that said transmission is not capable of applying said load during said idle condition due to said operating temperature, increasing an idle speed of said diesel engine to cool said transmission and waiting a predetermined period, wherein said increasing said idle speed and waiting said predetermined period are conditional upon determining that said transmission is not capable of applying said load during said idle condition due to said operating temperature; and in response to increasing said idle speed and upon said predetermined period elapsing, again determining whether said transmission is capable of applying said load; and regenerating a diesel particulate filter during the idle condition when said exhaust temperature exceeds a predetermined limit.

2. The method of claim 1, wherein said applying the load includes increasing said exhaust temperature of said diesel engine to a temperature greater than 500° C. during said idle condition.

3. The method of claim 1, further comprising determining a particulate matter accumulation level of said diesel particulate filter and said applying the load occurs when said determined particulate matter accumulation level is greater than a predetermined limit.

4. The method of claim 1, wherein said transmission includes an output shaft and said applying the load includes locking said output shaft to prevent rotation thereof.

5. The method of claim 4, wherein said transmission includes a torque converter clutch and said applying the load includes actuating said torque converter clutch while said output shaft is locked.

6. The method of claim 5, wherein said applying the load includes applying said load to a crankshaft of said diesel engine through actuation of said torque converter clutch.

7. A method comprising:

operating a vehicle including a diesel engine at an idle condition;

determining a particulate matter accumulation level in a diesel particulate filter in an exhaust gas flow path of said diesel engine; and applying a load to said diesel engine through a transmission coupled thereto during the idle condition to increase an exhaust temperature from said diesel engine when said determined particulate matter accumulation level is greater than a predetermined limit to regenerate said diesel particulate filter; wherein applying said load includes:

determining whether said transmission is capable of applying said load during said idle condition based on an operating temperature of said transmission;

in response to determining that said transmission is not capable of applying said load during said idle condition due to said operating temperature, increasing an idle speed of said diesel engine to cool said transmission and waiting a predetermined period, wherein said increasing said idle speed and waiting said predetermined period are conditional upon determining that said transmission is not capable of applying said load during said idle condition due to said operating temperature; and in response to increasing said idle speed and upon said predetermined period elapsing, again determining whether said transmission is capable of applying said load.

8. The method of claim 7, wherein said transmission includes an output shaft and said applying the load includes locking said output shaft to prevent rotation thereof.

9. The method of claim 8, wherein said transmission includes a torque converter clutch and said applying the load includes actuating said torque converter clutch while said output shaft is locked.

10. The method of claim 9, wherein said applying the load includes applying a load to a crankshaft of said diesel engine through actuation of said torque converter clutch.

11. A control module comprising:

a first electronic circuit configured to operate a diesel engine of a vehicle at an idle condition;

a second electronic circuit in communication with said first electronic circuit configured to determine a particulate matter accumulation level of a diesel particulate filter in an exhaust flow path of said diesel engine; and a third electronic circuit in communication with said first electronic circuit and said second electronic circuit configured to selectively apply a load to said diesel engine through a vehicle transmission coupled thereto during said idle condition to increase an exhaust temperature of said diesel engine to regenerate said diesel particulate filter during said idle condition, wherein selectively applying said load includes:

determining whether said transmission is capable of applying said load during said idle condition based on an operating temperature of said transmission;

in response to determining that said transmission is not capable of applying said load during said idle condition due to said operating temperature, increasing an idle speed of said diesel engine to cool said transmission and waiting a predetermined period, wherein said increasing said idle speed and waiting said predetermined period are conditional upon determining that said transmission is not capable of applying said load during said idle condition due to said operating temperature; and in response to increasing said idle speed and upon said predetermined period elapsing, again determining whether said transmission is capable of applying said load.

12. The control module of claim 11, wherein said third electronic circuit applies said load to increase said exhaust temperature of said diesel engine to a temperature of at least 500° C.

13. The control module of claim 11, wherein the first, second, and third electronic circuits include at least one of an Application Specific Integrated Circuit (ASIC), a processor and memory including code, and a combinational logic circuit.

14. The control module of claim 11, wherein said third electronic circuit selectively locks an output shaft of said transmission to apply said load.

15. The control module of claim 14, wherein said third electronic circuit actuates a torque converter clutch while said output shaft is locked to apply said load.

16. The control module of claim 15, wherein said third electronic circuit actuates said torque converter clutch to apply said load to a crankshaft of said diesel engine.

\* \* \* \* \*